(12) United States Patent
Hsieh et al.

(10) Patent No.: US 10,315,359 B2
(45) Date of Patent: Jun. 11, 2019

(54) THREE-DIMENSIONAL PRINTING METHOD

(71) Applicants: XYZprinting, Inc., New Taipei (TW); Kinpo Electronics, Inc., New Taipei (TW)

(72) Inventors: Shih-Sen Hsieh, New Taipei (TW); Ting-Hsiang Lien, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 139 days.

(21) Appl. No.: 15/636,619

(22) Filed: Jun. 28, 2017

(65) Prior Publication Data

US 2018/0339459 A1    Nov. 29, 2018

(30) Foreign Application Priority Data

May 26, 2017    (TW) .............................. 106117539 A (51) Int. Cl.
*B29C 33/72* (2006.01)
*G06F 17/50* (2006.01)
*G06F 19/00* (2018.01)
*B29C 64/393* (2017.01)
*B29C 64/118* (2017.01)
*B29C 64/112* (2017.01)
(Continued)

(52) U.S. Cl.
CPC .......... *B29C 64/393* (2017.08); *B29C 64/106* (2017.08); *B29C 64/112* (2017.08); *B29C 64/118* (2017.08); *B29C 64/35* (2017.08); *B29C 67/0007* (2013.01); *B33Y 10/00* (2014.12); *B33Y 40/00* (2014.12); *B33Y 50/02* (2014.12); *B33Y 70/00* (2014.12); *B29C 64/40* (2017.08); *B29C 2033/727* (2013.01); *G06F 2217/41* (2013.01)

(58) Field of Classification Search
CPC .............. B29C 33/72; B29C 2033/727; B29C 47/0877; B29C 47/0883; B29C 64/106; B29C 64/112; B29C 64/118; B29C 64/209; B29C 64/35; B29C 64/386; B29C 64/393; B29C 2947/92257; G06F 17/50; G06F 19/00; G06F 2217/41
USPC .................... 264/39, 245, 308; 700/118, 119
See application file for complete search history.

(56) References Cited

U.S. PATENT DOCUMENTS

| 2015/0190967 A1 | 7/2015 | Stava et al. |
| 2015/0251357 A1 | 9/2015 | Jin et al. |

(Continued)

OTHER PUBLICATIONS

"Search Report of Europe Counterpart Application", dated Apr. 23, 2018, p. 1-p. 7.

*Primary Examiner* — Leo B Tentoni
(74) *Attorney, Agent, or Firm* — JCIPRNET (57) ABSTRACT

A three-dimensional printing method for a three-dimensional printer is provided. The three-dimensional printer includes a model printing head and a color printing head arranged along an X-axis and co-constructed, wherein the model printing head prints a forming layer on an X-Y plane of a platform of the three-dimensional printer, and the color printing head colors a coloring zone of the forming layer along a Y-axis. The three-dimensional printing method includes: providing information of the coloring zone of the forming layer; determining the number of colorings of the color printing head according to the information of the coloring zone by a processor; and driving the model printing head by the processor to print the forming material outside a region of the forming layer.

19 Claims, 9 Drawing Sheets

(51) Int. Cl.
    *B33Y 10/00*     (2015.01)
    *B29C 64/106*     (2017.01)
    *B29C 64/35*     (2017.01)
    *B33Y 40/00*     (2015.01)
    *B33Y 50/02*     (2015.01)
    *B33Y 70/00*     (2015.01)
    *B29C 67/00*     (2017.01)
    *B29C 64/40*     (2017.01)

(56) References Cited

U.S. PATENT DOCUMENTS

2016/0096322 A1     4/2016   Cheng et al.
2016/0221259 A1     8/2016   Kobida et al.

FIG. 9

THREE-DIMENSIONAL PRINTING METHOD

CROSS-REFERENCE TO RELATED APPLICATION

This application claims the priority benefit of Taiwan application serial no. 106117539, filed on May 26, 2017. The entirety of the above-mentioned patent application is hereby incorporated by reference herein and made a part of this specification.

BACKGROUND

Technical Field

The disclosure relates to a three-dimensional printing method.

Description of Related Art

As technology advanced in recent years, many methods that utilize additive manufacturing technology (e.g., layer-by-layer model construction) to build three-dimensional (3D) physical models have been proposed. Generally speaking, the additive manufacturing technology is to transfer data of the design of a 3D model, which is constructed by software, such as computer-aided design (CAD), to multiple thin (quasi-two-dimensional) cross-sectional layers that are stacked in sequence.

Now many techniques have been developed for forming thin cross-sectional layers. For example, according to the information of each of the thin cross-sectional layers described above, a forming material may be sprayed or extruded onto a platform and then cured to form the thin cross-sectional layer, and by stacking such layers, a three-dimensional object can be formed. In addition, a printer may be equipped with a color printing head for coloring the thin cross-sectional layers or the three-dimensional object in or after the manufacturing process of the three-dimensional object.

In view of the above, how to properly execute the printing and coloring of the object in the manufacturing process without interfering with each other is an issue that needs to be addressed in this field.

SUMMARY

The disclosure provides a three-dimensional printing method, by which printing of a Banning material is performed in a region outside a contour of a forming layer as coloring is performed, so as to prevent the forming material in a model printing head from affecting the quality of the forming layer during operation of a color printing head.

A three-dimensional printing method of the disclosure is adapted for a three-dimensional printer. The three-dimensional printer includes a model printing head, a color printing head, and a platform. The model printing head is configured to print at least one forming layer on an X-Y plane of the platform with a forming material. The model printing head and the color printing head are arranged along an X-axis and are co-constructed. The color printing head colors a coloring zone of the forming layer along a Y-axis. The three-dimensional printing method includes: providing information of the coloring zone of the forming layer; determining the number of colorings of the color printing head according to the information of the coloring zone by a processor; and when the color printing head executes at least one of the colorings, driving the model printing head by the processor to print the forming material in a region outside a contour of the forming layer on the platform.

Based on the above, the three-dimensional printer includes the model printing head and the color printing head that are synchronously movable and arranged along the X-axis. In order to color the forming layer or the three-dimensional object that has been completed as the three-dimensional object is being printed, and prevent the forming material in the model printing head from affecting the printed forming layer when the model printing head passes the forming layer during coloring of the color printing head, like the processes described above, the model printing head is driven to the platform region outside the forming layer to discharge the forming material that remains in the model printing head during the coloring of the color printing head. Thus, before the color printing head colors the forming layer, the forming material in the model printing head may be removed by the aforementioned operation for cleaning before the model printing head passes the forming layer.

To make the aforementioned and other features and advantages of the invention more comprehensible, several embodiments accompanied with figures are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
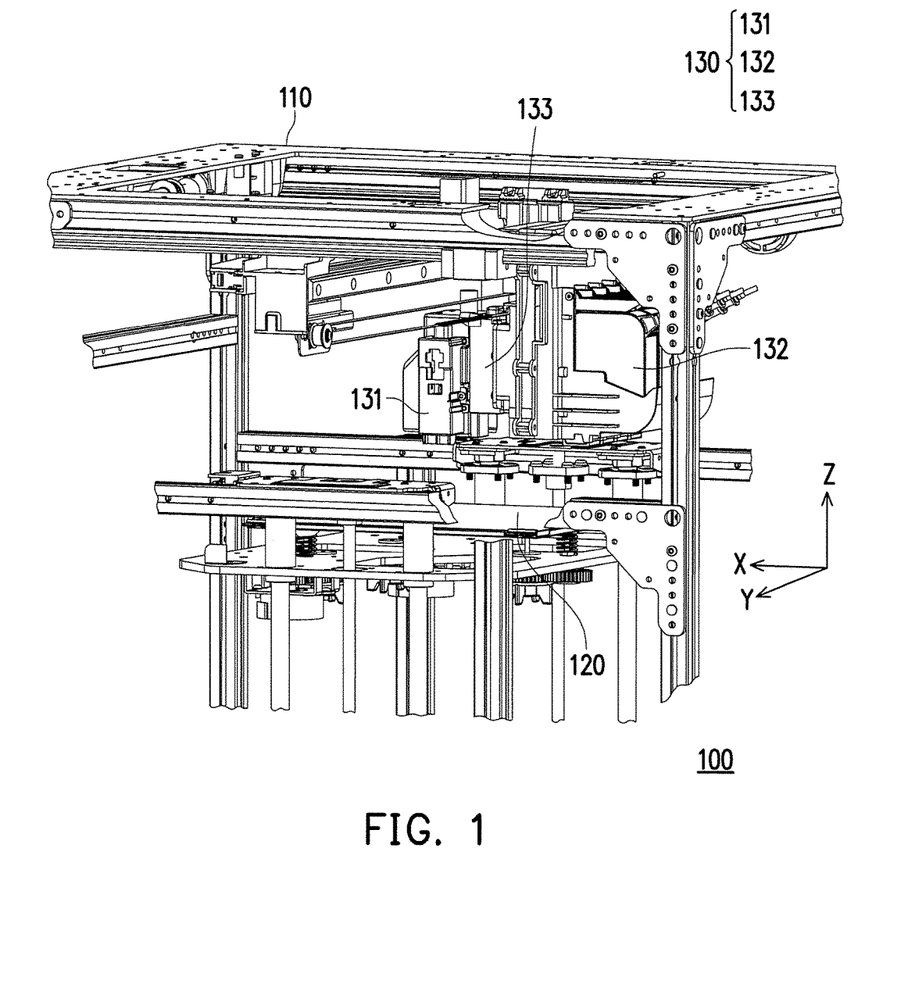
FIG. 1 is a schematic view showing a part of a three-dimensional printer according to an embodiment of the disclosure.
Figure 2A:
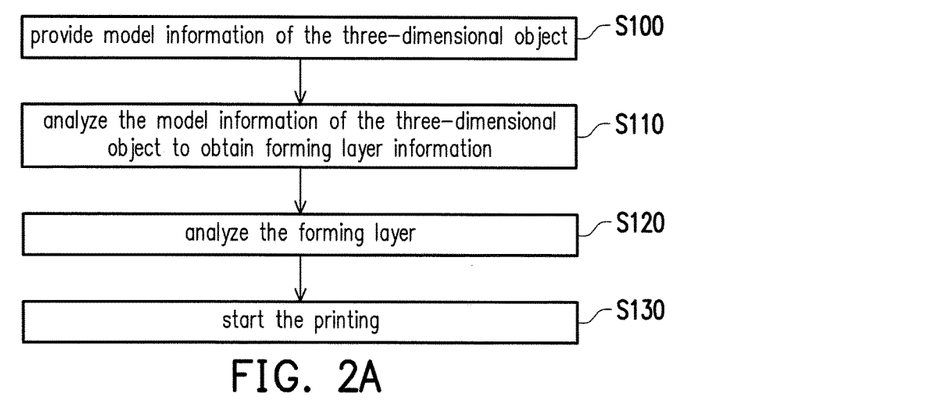
FIG. 2A and FIG. 2B are flowcharts respectively showing a three-dimensional printing method.
Figure 2B:
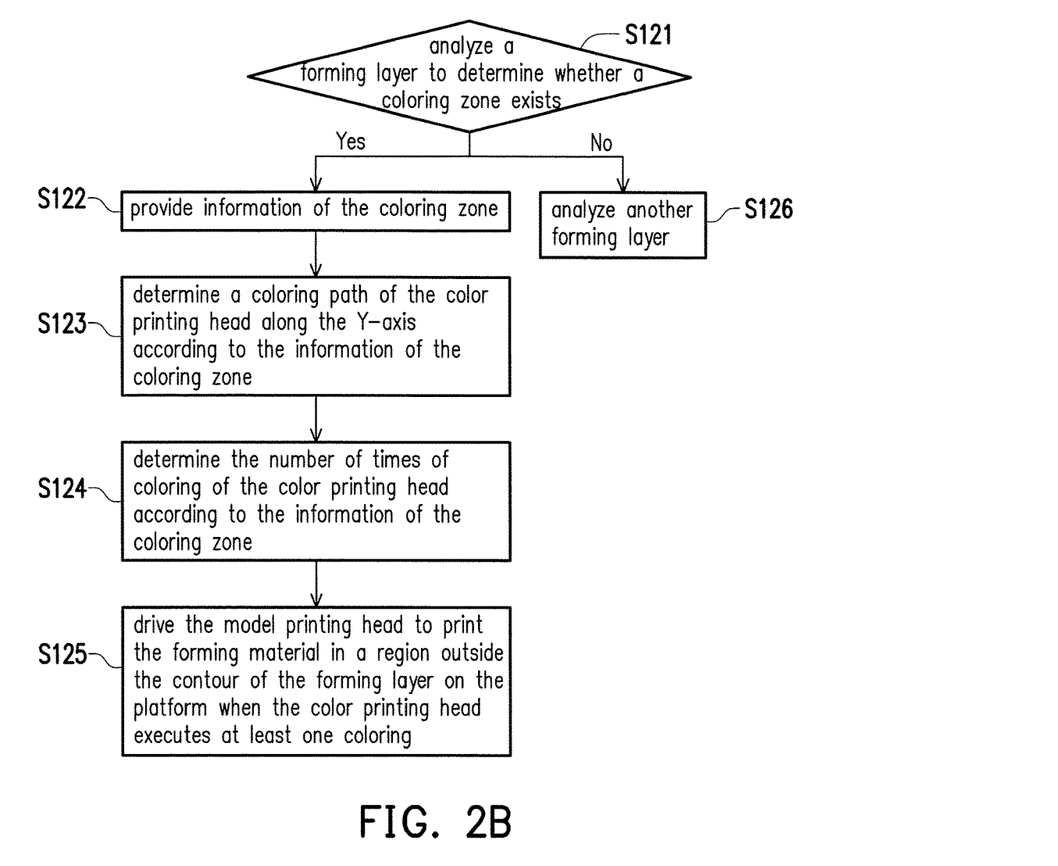
Figure 3:
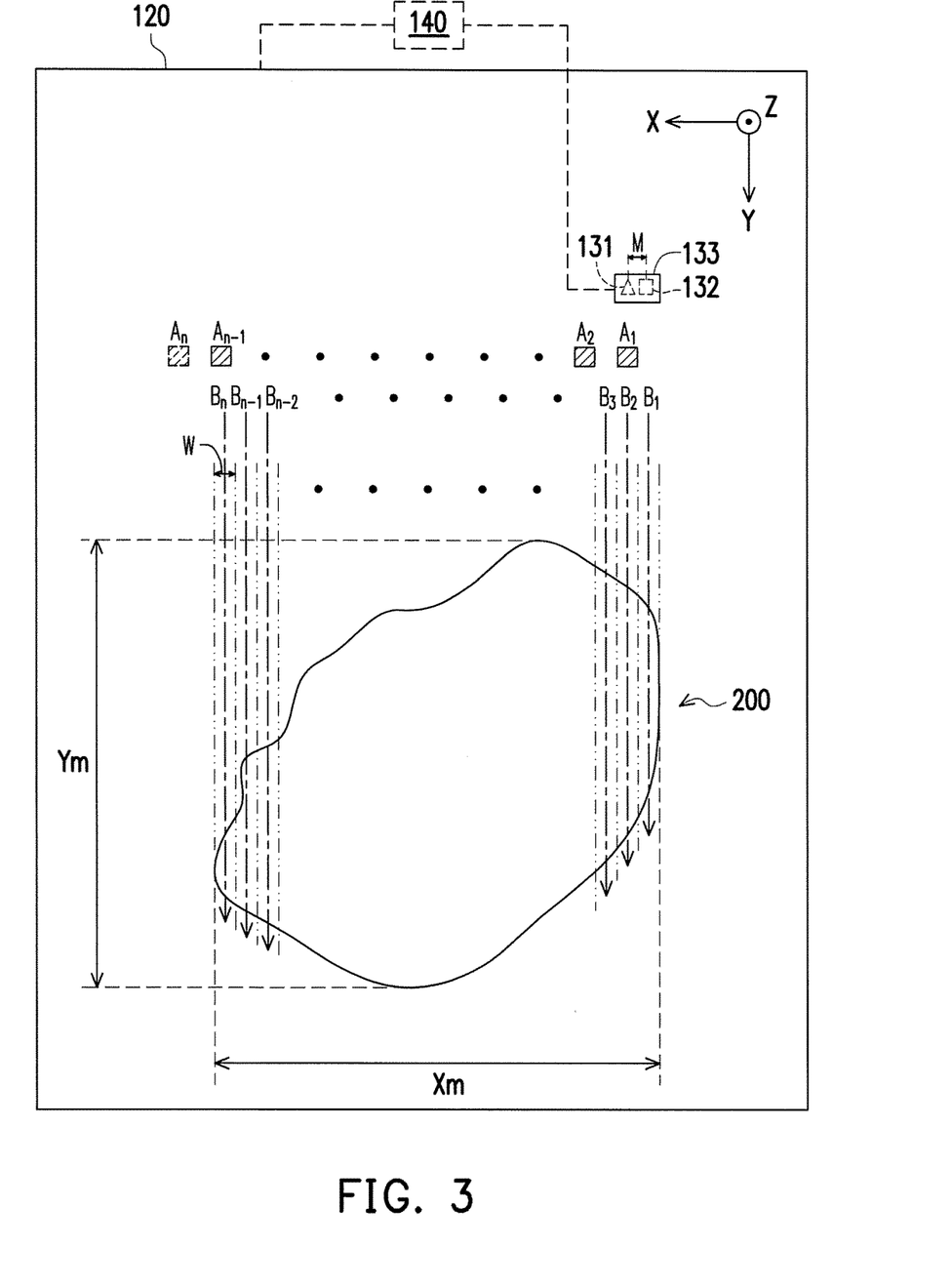
FIG. 3 is a schematic top view showing a part of the three-dimensional printer.

FIG. 1 is a schematic view showing a part of a three-dimensional printer according to an embodiment of the disclosure. FIG. 2A and FIG. 2B are flowcharts respectively showing a three-dimensional printing method. FIG. 3 is a schematic top view showing a part of the three-dimensional printer. Referring to FIG. 1 to FIG. 3, in this embodiment, a three-dimensional printer 100 includes a frame 110, a platform 120, a printing assembly 130, and a control module 140 (shown in FIG. 3). Here, the three-dimensional printer 100 is a fused deposition modeling (FDM) device, for example, which prints forming layers 200 on the platform 120 layer by layer with a model printing head 131 of the printing assembly 130, so as to stack and form a three-dimensional object. The printing assembly 130 further includes a color printing head 132, which is an inkjet head, for example, for coloring the forming layer or the three-dimensional object.

It should be noted that the model printing head 131 and the color printing head 132 of this embodiment are arranged along an X-axis and move synchronously. More specifically, as shown in FIG. 1 and FIG. 3, the printing assembly 130 further includes a moving member 133 that is movably assembled to the frame 110 and electrically connected to the control module 140. The model printing head 131 and the color printing head 132 are assembled to the moving member 133 respectively and thus are movable along with the moving member 133 in the frame 110. Here, the model printing head 131 and the color printing head 132 are disposed on the same moving member 133 to form a co-construction structure. That is, the model printing head 131 and the color printing head 132 may be moved synchronously by one single driving means (by driving the moving member 133 only) (it may be deemed that there is no relative movement between the model printing head 131 and the color printing head 132).

Accordingly, when the color printing head 132 colors the forming layer or the three-dimensional object, the model printing head 131 may pass the forming layer or the three-dimensional object along with the color printing head 132. Moreover, when the model printing head 131 has just completed printing the forming layer or the three-dimensional object, a residual of the forming material may remain in the model printing head 131. Thus, when the model printing head 131 passes the forming layer or the three-dimensional object as described above, the residual of the forming material may drip down or fall onto the forming layer or the three-dimensional object that has been completed.

In order to prevent the residual of the forming material from affecting the quality of the printing target, in this embodiment, a three-dimensional printing method is provided, by which the model printing head is driven to perform relevant operations as the color printing head operates, so as to prevent the aforementioned situation from affecting the quality of the forming layer or the three-dimensional object.

It should also be noted that the three-dimensional printing method may be executed as soon as a three-dimensional model is completed. That is, after construction of a three-dimensional object model is completed by computer-aided design, the three-dimensional model may be layer-analyzed by a processor of the control module 140 by the aforementioned three-dimensional method to provide an operation command for the three-dimensional printer to carry out the printing. Of course, in another embodiment not shown here, the layer analysis may be performed by other computer devices to generate a corresponding command, which is then imported into the three-dimensional printer 100. In that case, the processor for the analysis may be regarded as being disposed in the other computers.

Referring to FIG. 2A and FIG. 2B, in this embodiment, first, in Step S100, model information of the three-dimensional object is provided. Next, in Step S110, the model information of the three-dimensional object is analyzed to obtain forming layer information. Here, the forming layer is formed by transferring design data of a software-constructed 3D model to multiple thin (quasi-two-dimensional) cross-sectional layers that are stacked sequentially. In Step S120, the forming layer is analyzed by the three-dimensional printing method via the processor. Finally, in Step S130, an operation command is generated from the analysis result to drive the three-dimensional printer 100 to start the printing. In addition, FIG. 2B further specifies processes of Step S120 of FIG. 2A. That is, the processes of FIG. 2B are to analyze the information of one of the forming layers, so as to obtain the command for driving the three-dimensional printer 100 afterward.

It should be noted that the three-dimensional printing method of this embodiment is used together with rectangular coordinates X-Y-Z for more specifically define and describe the configuration and movement of the relevant components. Here, the platform 120 has an X-Y plane, and the multiple forming layers are stacked in a positive Z-axis direction to form the three-dimensional object. Nevertheless, the disclosure is not limited thereto. In other words, the components have relative configuration and movement, which may be described in different ways when other coordinate systems are applied, but the relationship among the components remains unchanged.

Referring to FIG. 2B and FIG. 3, in this embodiment, first, in Step S121, whether a coloring zone exists in the forming layer 200 is determined. If it is confirmed that the forming layer 200 needs to be colored, Step S122 is executed to provide information of the coloring zone. Then, in Step S123, the processor determines a coloring path of the color printing head 132 along the Y-axis according to the information of the coloring zone. In Step S124, the processor determines the number of times of coloring of the color printing head 132 according to the information of the coloring zone. Thereafter, in Step S125, when the color printing head 132 executes at least one coloring, the model printing head 131 is driven simultaneously to print the forming material in a region outside the contour of the forming layer on the platform 120. Accordingly, the forming material is printed in the region outside the contour of the forming layer, and the printing is carried out simultaneously with the coloring. Therefore, the residual of the forming material that remains in the model printing head 131 may be discharged first to a non-forming layer region to prevent the residual of the forming material in the model printing head 131 from falling onto the forming layer during coloring.

More specifically, referring to FIG. 2B and FIG. 3, in this embodiment, after it is confirmed in Step S121 that the forming layer 200 needs to be colored, when Step S122 is executed, preferably orthogonal projection information of the coloring zone on the X-Y plane and a coloring resolution of the color printing head 132 along the X-axis are provided. On the other hand, if the forming layer does not include the coloring zone, analysis for another forming layer is performed directly.

Please refer to FIG. 3, which shows an orthogonal projection contour of the forming layer 200 on the X-Y plane. That is, when the 3D model information of the three-dimensional object is analyzed into multiple forming layers, each forming layer has the contour information as shown in FIG. 3, wherein an orthogonal projection size of the framing layer 200 on the X-axis is $X_m$ and an orthogonal projection size of the forming layer 200 on the Y-axis is $Y_m$, which respectively indicate the size maximum values along the X-axis and the Y-axis when the forming layer 200 corresponds to the rectangular coordinates X-Y-Z, so as to define a bounding box of the forming layer 200 on the X-Y plane.

It should be noted that, in this embodiment, the entire region of the forming layer 200 is the coloring zone. Other embodiments regarding the forming layer and the coloring zone will be described in detail later.

Next, in Step S123, preferably the processor determines the coloring path of the color printing head 132 along the Y-axis according to the orthogonal projection size $Y_m$ of the coloring zone on the Y-axis. As shown in FIG. 3, the color printing head 132 is driven by the moving member 133 to sequentially color the forming layer 200 in the direction indicated by the arrow (positive Y-axis direction). More specifically, here the coloring zone (in this embodiment, the coloring zone covers the entire region of the forming layer 200) of the forming layer 200 is divided into a plurality of bands along the Y-axis. A width W of each band represents a coloring resolution of the color printing head 132 along the X-axis, that is, a coloring width that the color printing head 132 is able to provide each time the color printing head 132 travels along the Y-axis. Accordingly, in Step S124, the number of colorings of the color printing head 132 is determined according to the orthogonal projection size of the coloring zone on the X-axis and the coloring resolution of the color printing head 132. $B_1$, $B_2$, $B_3$ ... $B_{n-2}$, $B_{n-1}$, and $B_n$ as shown in FIG. 3 represent different colorings required for the color printing head 132 to color the coloring zone of the forming layer 200 (or a brush number, which represents that the color printing head 132 is able to print a color band with a width smaller than or equal to the width W by each brush; the coloring zone may be regarded as being formed by gradually connecting a plurality of color bands, which extend along the Y-axis, along the X-axis). Here, it is represented by the sequence $\{B_n\}$, wherein n is a positive integer that changes with the size and range of the coloring zone of the forming layer.

Then, in Step S125, after confirming the information above, when the color printing head 132 executes at least one coloring, the model printing head 131 is driven to print the forming material in a region different from the forming layer 200 on the platform 120. As shown in FIG. 3, since the model printing head 131 and the color printing head 132 are disposed on the same moving member 133, the model printing head 131 passes the forming layer 200 that has been printed along with the moving member 133 during the coloring. For example, during the first coloring (i.e., $B_1$) performed by the color printing head 132, before the color printing head 132 reaches the coloring zone of the forming layer 200, the model printing head 131 is driven to perform printing in a region $A_1$ first. Likewise, during the subsequent colorings (i.e., $B_1$ to $B_n$) performed by the color printing head 132, before the color printing head 132 reaches the coloring zone of the forming layer 200, the model printing head 131 is driven first to perform printing in regions $A_2$ to $A_n$. That is, after the model printing head 131 completes the printing of the forming layer 200, the residual of the forming material may remain in the model printing head 131. Through the operation described above, the residual of the foil ling material may be discharged before the color printing head 132 reaches the coloring zone by forcibly enabling the model printing head 131 to perform printing. Since the regions $A_1$ to $A_n$ for printing the residual of the forming material are different from the region of the forming layer on the platform 120, the forming process and quality of the three-dimensional object are not affected. More specifically, in the case where the three-dimensional object is formed by stacking multiple forming layers on the X-Y plane along the Z-axis, the regions $A_1$ to $A_n$ are substantially outside the range of the positive projection contour of the three-dimensional object on the X-Y plane. Here, it is represented by the sequence $\{An\}$, wherein n is a positive integer.

Based on the above, when Step S122 to Step S125 are completed, the analysis on one forming layer is completed, and the operation commands for the model printing head 131 and the color printing head 132 are generated accordingly. Thus, in Step S120, the above-described Step S121 to Step S125 are repeated until all the forming layers of the three-dimensional object are analyzed.

Here it should be noted that, in this embodiment, the relationship between the forming layer of the three-dimensional object and the head modules and platform of the three-dimensional printer is defined by the rectangular coordinates X-Y-Z. However, the disclosure is not limited thereto. The relationship may be adjusted as appropriate according to different spatial coordinates.

The region $\{An\}$ for different printing modes is described hereinafter.

Referring to FIG. 3 again, in addition to driving the model printing head 131 to perform printing in the region $\{A_n\}$ every time the coloring $\{B_n\}$ is performed, as described above, in another mode, the configuration of the model printing head 131 and the color printing head 132 may be changed as appropriate.

As shown in FIG. 3, a space M exists between the model printing head 131 and the color printing head 132 along the X-axis, and the color printing head 132 is moved along the X-axis to be switched to another band between any adjacent two colorings. Thus, in the direction that the color printing head 132 is moved along the X-axis (positive X-axis direction), the model printing head 131 is in front of the color printing head 132. Therefore, when the color printing head 132 executes the coloring $B_n$, the coloring paths of the model printing head 131 and the color printing head 132 are maintained at the space M and do not pass the forming layer 200 (in fact, when the color printing head 132 changes from the coloring $B_{n-1}$ to the coloring $B_n$, the model printing head 131 has moved away from the forming layer 200). On the other hand, when the color printing head 132 executes the colorings $B_1$ to $B_{n-1}$, the model printing head 131 is driven to print the forming material in the regions $A_1$ to $A_{n-1}$. Thus, in this mode, the process of printing the residual of the forming material in the region $A_n$ may be omitted, e.g., the region $A_n$ indicated by the dotted line of FIG. 3.

Figure 4:
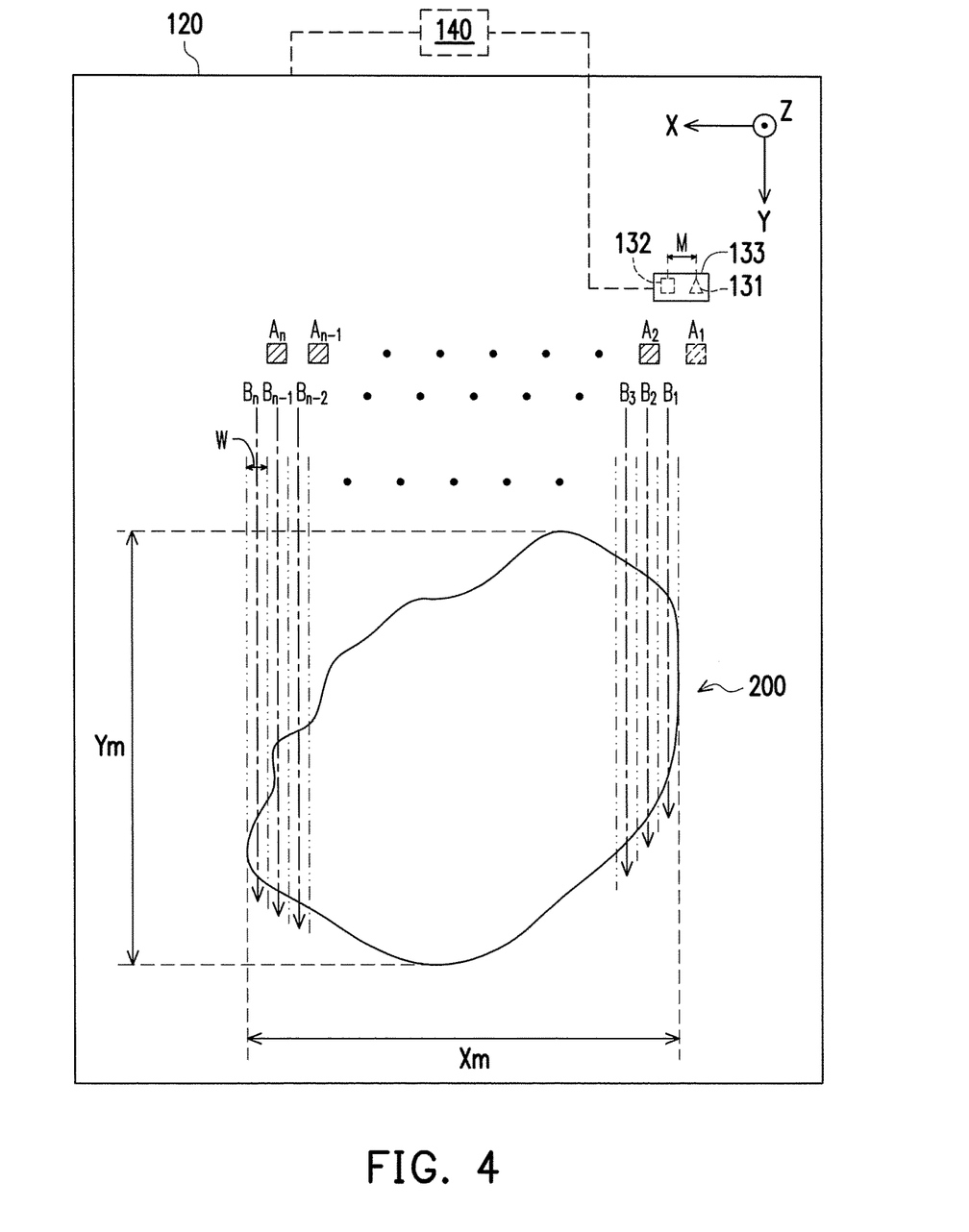
FIG. 4 is a schematic top view showing a part of the three-dimensional printer according to another embodiment.

FIG. 4 is a schematic top view showing a part of the three-dimensional printer according to another embodiment. Referring to FIG. 4, this embodiment differs from the previous embodiment in that, in this embodiment, the color printing head 132 is in front of the model printing head 131 in the direction that the color printing head 132 is moved along the X-axis (positive X-axis direction). Therefore, when the color printing head 132 executes the coloring $B_1$, the coloring paths of the model printing head 131 and the color printing head 132 are maintained at the space M and do not pass the forming layer 200. In other words, the model printing head 131 is still away from the forming layer 200 and does not pass the forming layer 200 during the coloring $B_1$. Hence, the first printing for the region $A_1$ may be omitted, as indicated by the dotted line of FIG. 4. On the other hand, the model printing head 131 is driven to print the forming material in the regions $A_2$ to $A_n$ only when the color printing head 132 executes the colorings $B_2$ to $B_n$.

Of course, under this configuration, the mode in which the forming material is still printed in the region $A_1$ may also be adopted.

Figure 5:
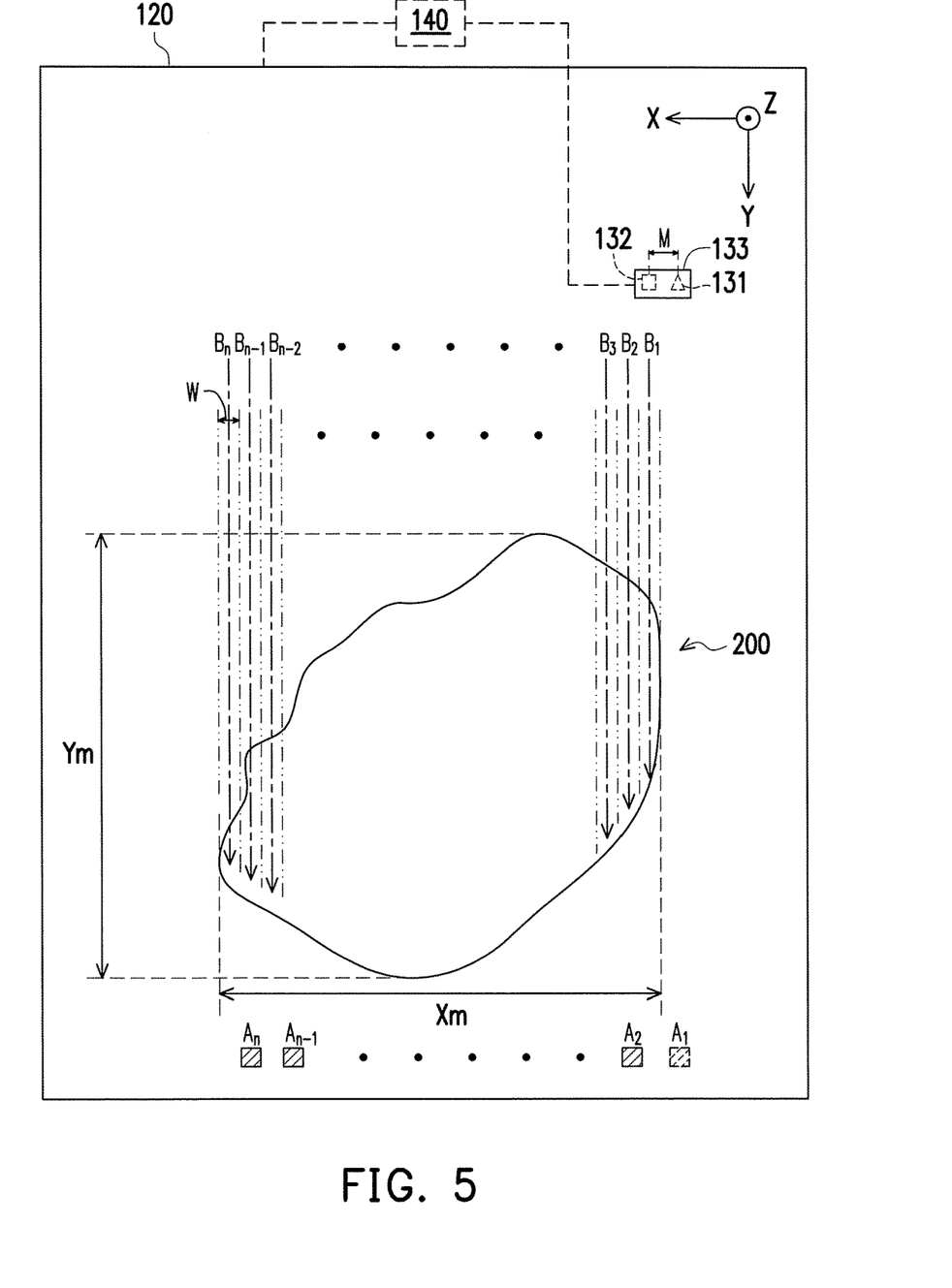
FIG. 5 is a schematic top view showing a part of the three-dimensional printer according to another embodiment.

FIG. 5 is a schematic top view showing a part of the three-dimensional printer according to another embodiment. This embodiment differs from the previous embodiment in that, in this mode, in the process of coloring, the model printing head 131 is driven to perform printing only after the color printing head 132 is moved away from the coloring zone of the forming layer 200. In other words, in the embodiments shown in FIG. 3 and FIG. 4, the regions $A_1$ to $A_n$ are in front of the forming layer 200 in the coloring direction of the color printing head 132 along the Y-axis (positive Y-axis direction), while in the embodiment of FIG. 5, the forming layer 200 is in front of the regions $A_1$ to A in the coloring direction of the color printing head 132 along the Y-axis (positive Y-axis direction).

In addition, it can be clearly known from FIG. 4 and FIG. 5 that, since the color printing head 132 is in front of the model printing head 131 in the positive X-axis direction, when the color printing head 132 performs the first coloring (i.e., the coloring $B_1$), the model printing head 131 does not pass the forming layer 200. Therefore, when the mode in which printing of the forming material is required is selected, the region for printing the forming material may be located at any position on the platform 120 between the region $A_1$ shown in FIG. 4 and the region $A_1$ shown in FIG. 5 along the Y-axis.

Figure 6:
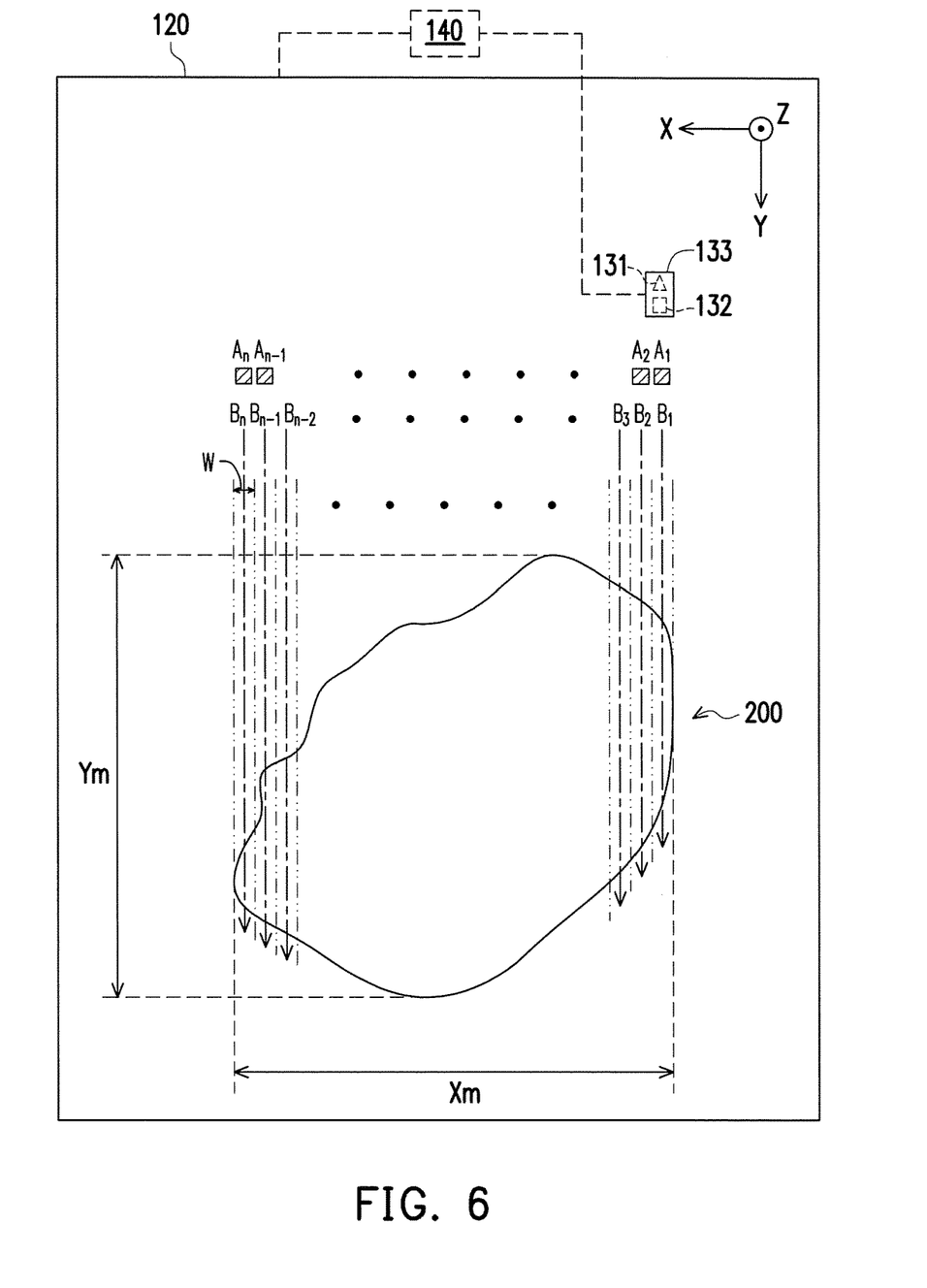
FIG. 6 is a schematic top view showing a part of the three-dimensional printer according to another embodiment.

FIG. 6 is a schematic top view showing a part of the three-dimensional printer according to another embodiment. This embodiment differs from the previous embodiment in that the orthogonal projections of the model printing head 131 and the color printing head 132 on the X-axis substantially overlap each other, which indicates that the regions $A_1$ to $A_n$ are on the coloring path of the color printing head 132. Accordingly, the regions $A_1$ to $A_n$ are substantially aligned with the colorings $B_1$ to $B_n$.

Figure 7:
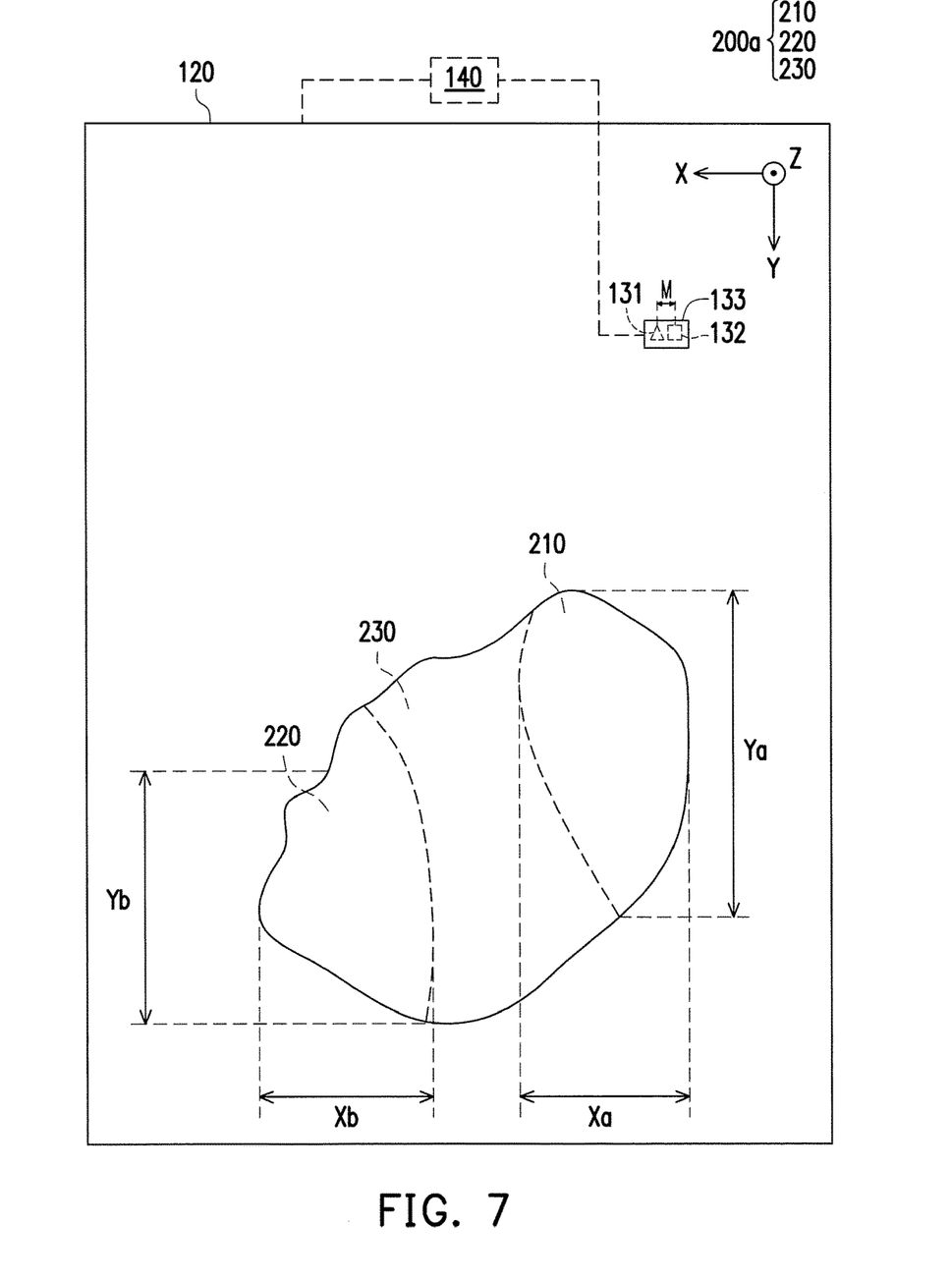
FIG. 7 is a schematic top view showing a part of the three-dimensional printer according to another embodiment.

FIG. 7 is a schematic top view showing a part of the three-dimensional printer according to another embodiment. In the previous embodiment, the entire region of the forming layer is the coloring zone. However, in this embodiment, a forming layer 200a has portions 210, 220, and 230 that are different from one another, wherein the portion 230 does not need to be colored. In other words, the coloring zone covers the different portions 210 and 220 of the forming layer 200a. Nevertheless, the analysis on the coloring zone, as specified in the above-described Step S122 to Step S125, is performed separately for the portions 210 and 220, and orthogonal projection sizes $X_a$, $Y_a$, $X_b$, and $Y_b$ of the portions 210 and 220 on the X-axis and the Y-axis are provided respectively for the respective analyses. Details thereof are not repeated hereinafter.

Referring to FIG. 3 again, in this embodiment, the color printing head 132 is driven in the following manner: after moving in the positive Y-axis direction and passing the forming layer 200, the color printing head 132 moves back along the same path (moves in the negative Y-axis direction) and then moves in the positive X-axis direction to be switched to the next band to perform coloring in the positive Y-axis. It should be noted that when the color printing head 132 moves back, the model printing head 131 also moves back along the same path and therefore passes the region {An} for printing the forming material again. Thereby, the model printing head 131 contacts the forming material that has been printed in the region {An} again, so as to sweep and clean the model printing head 131 again with the printed forming material.

Figure 8:
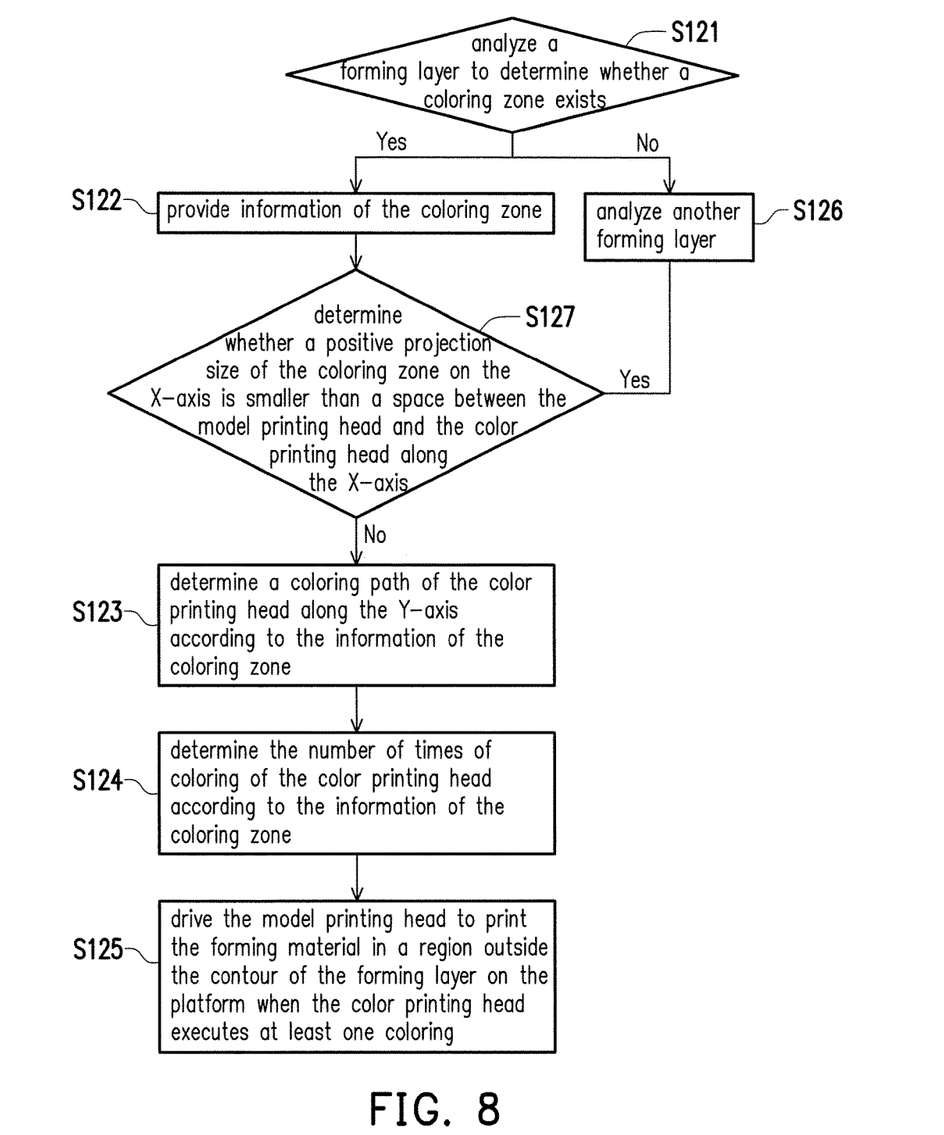
FIG. 8 shows a three-dimensional printing method according to another embodiment.
Figure 9:
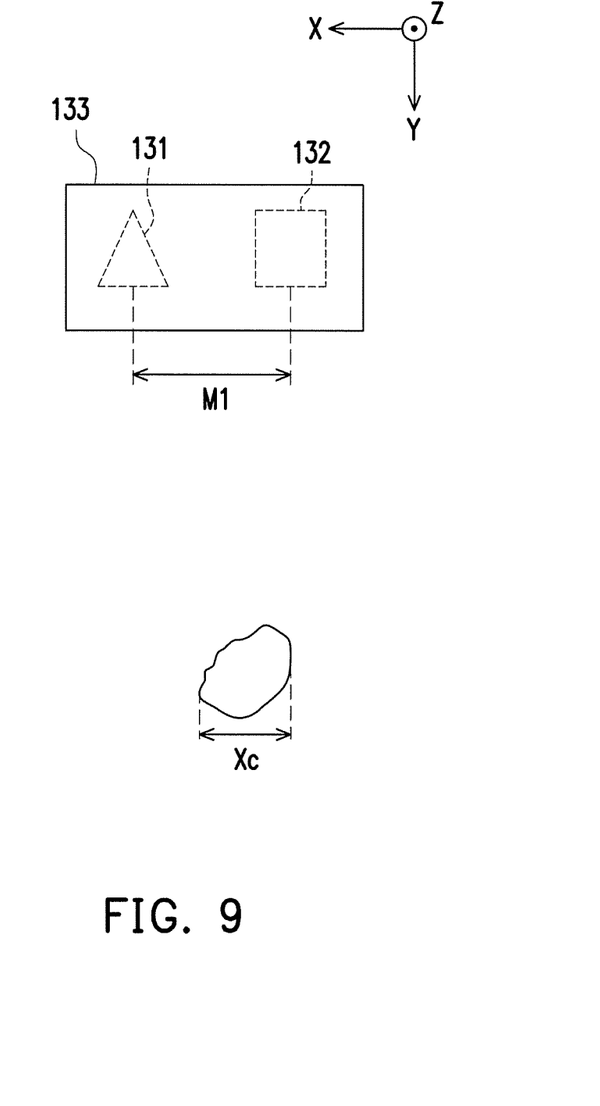
FIG. 9 is a schematic top view showing a part of the three-dimensional printer according to another embodiment.

FIG. 8 shows a three-dimensional printing method according to another embodiment. Referring to FIG. 8, in this embodiment, the three-dimensional printing method further includes Step S127 to determine whether the orthogonal projection size of the coloring zone on the X-axis is smaller than the space between the model printing head 131 and the color printing head 132 along the X-axis. In the embodiments shown in FIG. 3 to FIG. 6, the orthogonal projection size $X_m$ of the coloring zone on the X-axis is larger than the space M between the model printing head 131 and the color printing head 132 along the X-axis. Thus, the subsequent steps are as shown in FIG. 2B. FIG. 9 is a schematic top view showing a part of the three-dimensional printer according to another embodiment. Referring to FIG. 8 and FIG. 9, in this embodiment, a space M1 between the model printing head 131 and the color printing head 132 is significantly larger than an orthogonal projection size $X_c$ of a forming layer 200c on the X-axis. That is, as the color printing head 132 is driven to color the forming layer 200c, the model printing head 131 does not pass the forming layer 200c. Therefore, the problem that the residual of the forming material in the model printing head 131 may fall onto the forming layer 200c, as described above, does not occur. Accordingly, in the embodiment shown in FIG. 8, the corresponding mode adopted is that: the model printing head 131 is not driven to perform printing when the color printing head 132 colors the coloring zone. In other words, the operation command corresponding to this is not generated in the analysis of Step S120.

In another mode, nevertheless, even if the model printing head 131 does not pass the forming layer during coloring, the command for performing printing may still be made to achieve the effect of removing the residual. Moreover, in the case where the three-dimensional object is formed by stacking multiple forming layers, according to the three-dimensional printing method of this embodiment, the region for printing the forming layer during the coloring needs to be outside the orthogonal projection contour of the three-dimensional object on the X-Y plane, so as to prevent different forming layers from interfering with the forming material discharged during coloring. In other words, the processor needs to take the whole bounding box that the three-dimensional object forms on the X-Y plane into consideration, instead of one single forming layer.

For example, if the three-dimensional object has a pyramid shape and is positioned upside down on the X-Y plane, it means that the area of the previous forming layer is smaller than the area of the following forming layer. Thus, when analyzing the forming layer and the coloring zone, the processor needs to take the maximum area, i.e., the area contour of the last forming layer, into consideration so as to put the region for printing the forming material during coloring outside the range of the last forming layer, and thereby prevent the residual of the forming material that has been just printed from interfering with the printing of the following forming layer. In other words, in another embodiment of the disclosure not shown here, the processor drives the model printing head to print the forming material in a region outside the contour of the forming layer on the platform. Here, the region refers to a region that is outside the layer with the maximum contour range after the three-dimensional object is divided into layers.

Moreover, in another embodiment, if the three-dimensional object has an upright pyramid shape, it means that the area of the previous forming layer is larger than the area of the following forming layer. Thus, when analyzing the forming layer and the coloring zone, the processor needs to take the maximum area, i.e., the area contour of the first forming layer, into consideration so as to put the region for discharging the residual of the forming material outside the area contour of the first forming layer, and thereby prevent the region for discharging the residual of the forming material, which is outside the range of the forming layer in the same level, from falling in the range of the previous forming layer(s) during coloring of the following forming layers.

To sum up, in the embodiments of the disclosure described above, the model printing head and the color printing head of the three-dimensional printer are co-constructed and are disposed on the same moving member to be moved synchronously. Thus, as the forming layer or the three-dimensional object is colored, the model printing head will pass the forming layer or the three-dimensional object that has been printed. Accordingly, in the disclosure, the driving mode is adjusted during the coloring so as to prevent the residual of the forming material in the model printing head from affecting the forming layer or the three-dimensional object.

More specifically, in the three-dimensional printing method of the disclosure, after the 3D model information of the three-dimensional object is analyzed into multiple forming layers, whether each forming layer has a coloring zone is analyzed. If the forming layer needs to be colored, the configuration state of the model printing head and the color printing head, the coloring path of the color printing head, and the resolution of the color printing head are confirmed first so as to determine to perform printing in the region outside the forming layer on the platform. Moreover, the printing is performed during coloring but before the color printing head reaches the forming layer, so as to print out the residual of the forming material in the model printing head to prevent the residual of the forming material from falling onto the forming layer or the three-dimensional object.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A three-dimensional printing method adapted for a three-dimensional printer, which comprises a model printing head, a color printing head, and a platform, wherein the model printing head is configured to print at least one forming layer on an X-Y plane of the platform with a forming material, the model printing head and the color printing head are arranged along an X-axis and co-constructed, and the color printing head is configured to color a coloring zone of the forming layer along a Y-axis, the three-dimensional printing method comprising:
   providing information of the coloring zone of the forming layer;
   determining the number of colorings of the color printing head according to the information of the coloring zone by a processor; and
   when the color printing head executes at least one of the colorings, driving the model printing head to print the forming material in a region outside a contour of the forming layer on the platform by the processor,
   wherein the region is located on a moving path of the model printing head and at a related position of a coloring path of the color printing head, a residual of the forming material remains in the model printing head after the model printing head prints the forming layer, and every time the color printing head performs the coloring, the processor drives the model printing head to print the residual of the forming material in the region along with a movement of the color printing head.

2. The three-dimensional printing method according to claim 1, wherein the colorings are represented by $\{B_n\}$ and n is a positive integer, and when the color printing head executes the colorings $B_2, B_3 \ldots B_n$, the processor drives the model printing head to print the residual of the forming material in the region.

3. The three-dimensional printing method according to claim 2, wherein a space exists between the model printing head and the color printing head along the X-axis, and when the color printing head executes the coloring $B_1$, the model printing head and the coloring path of the color printing head are maintained at the space and do not pass the forming layer.

4. The three-dimensional printing method according to claim 2, wherein the color printing head is moved along the X-axis between any adjacent two colorings, and in a direction that the color printing head is moved along the X-axis, the color printing head is in front of the model printing head.

5. The three-dimensional printing method according to claim 1, wherein the colorings are represented by $\{B_n\}$ and n is a positive integer, and when the color printing head executes the colorings $B_1, B_2 \ldots B_{n-1}$, the processor drives the model printing head to print the residual of the forming material in the region.

6. The three-dimensional printing method according to claim 5, wherein a space exists between the model printing head and the color printing head along the X-axis, and when the color printing head executes the coloring $B_n$, the model printing head and the coloring path of the color printing head are maintained at the space and do not pass the forming layer.

7. The three-dimensional printing method according to claim 5, wherein the color printing head is moved along the X-axis between any adjacent two colorings, and in a direction that the color printing head is moved along the X-axis, the model printing head is in front of the color printing head.

8. The three-dimensional printing method according to claim 1, wherein in a coloring direction of the color printing head along the Y-axis, the forming layer is in front of the region.

9. The three-dimensional printing method according to claim 1, wherein in a coloring direction of the color printing head along the Y-axis, the region is in front of the forming layer.

10. The three-dimensional printing method according to claim 1, wherein the coloring zone covers at least a portion of the forming layer.

11. The three-dimensional printing method according to claim 1, wherein the coloring zone covers a plurality of different portions of the forming layer.

12. The three-dimensional printing method according to claim 1, further comprising:
    every time the color printing head has been driven by the processor and completed the coloring, driving the color printing head to move back along the Y-axis to pass the region, so as to enable the model printing head to contact the forming material in the region.

13. The three-dimensional printing method according to claim 1, wherein the region is on the coloring path of the color printing head.

14. The three-dimensional printing method according to claim 1, wherein the three-dimensional printing method is a fused deposition modeling (FDM) printing method.

15. The three-dimensional printing method according to claim 1, wherein a space exists between the model printing head and the color printing head along the X-axis, and an orthogonal projection size of the coloring zone on the X-axis is larger than or equal to the space.

16. The three-dimensional printing method according to claim 1, wherein a space exists between the model printing head and the color printing head along the X-axis, and an orthogonal projection size of the coloring zone on the X-axis is smaller than the space.

17. The three-dimensional printing method according to claim 1, wherein the processor further determines the number of colorings of the color printing head according to a coloring resolution of the color printing head along the X-axis.

18. The three-dimensional printing method according to claim 1, wherein the region is located outside an orthogonal projection range of a three-dimensional object on the X-Y plane.

19. A three-dimensional printing method adapted for a three-dimensional printer, which comprises a model printing head, a color printing head, and a platform, wherein the model printing head is configured to print at least one forming layer on an X-Y plane of the platform with a forming material, the model printing head and the color printing head are arranged along an X-axis and co-constructed, a space exists between the model printing head and the color printing head along the X-axis, and the color printing head is configured to color a coloring zone of the forming layer along a Y-axis, the three-dimensional printing method comprising:

providing information of the coloring zone of the forming layer;

determining a coloring path of the color printing head along the Y-axis according to the information of the coloring zone by a processor, wherein the coloring path forms a single coloring;

determining the number of the colorings $\{B_n\}$ of the color printing head according to the information of the coloring zone by the processor, wherein n is a positive integer;

determining whether an orthogonal projection size of the coloring zone on the X-axis is smaller than the space by the processor; and if the orthogonal projection size of the coloring zone on the X-axis is smaller than the space, not driving the model printing head to perform printing by the processor when the color printing head colors the coloring zone, and if the orthogonal projection size of the coloring zone on the X-axis is larger than or equal to the space, driving the model printing head by the processor to print the forming material in a region outside a contour of the forming layer on the platform while the color printing head colors the coloring zone, wherein the region is located on a moving path of the model printing head and at a related position of the coloring path of the color printing head, and every time the color printing head is driven to color the coloring zone along the coloring path, the model printing head is driven by the processor to print the forming material in the region along with a movement of the color printing head.

* * * * *